United States Patent
Park et al.

(10) Patent No.: US 11,182,480 B2
(45) Date of Patent: Nov. 23, 2021

(54) IDENTIFICATION OF MALWARE

(71) Applicant: McAfee, LLC, San Jose, CA (US)

(72) Inventors: William Park, Kitchener (CA); Jason Chan, Waterloo (CA); Wilson Shing-Hay Li, Kitchener (CA)

(73) Assignee: McAfee, LLC, San Jose, CA (US)

( * ) Notice: Subject to any disclaimer, the term of this patent is extended or adjusted under 35 U.S.C. 154(b) by 73 days.

(21) Appl. No.: 16/145,945

(22) Filed: Sep. 28, 2018

(65) Prior Publication Data

US 2020/0104489 A1   Apr. 2, 2020

(51) Int. Cl.

| | |
|---|---|
| *G06F 12/14* | (2006.01) |
| *G06F 21/56* | (2013.01) |
| *G06F 21/55* | (2013.01) |
| *H04L 29/06* | (2006.01) |
| *H04L 12/26* | (2006.01) |
| *G06F 16/903* | (2019.01) |

(52) U.S. Cl.
CPC ...... *G06F 21/563* (2013.01); *G06F 16/90344* (2019.01); *G06F 21/552* (2013.01); *G06F 21/554* (2013.01); *H04L 43/16* (2013.01); *H04L 63/101* (2013.01); *H04L 63/145* (2013.01); *H04L 63/20* (2013.01); *G06F 2221/2119* (2013.01)

(58) Field of Classification Search
CPC ............. H04L 63/145; H04L 29/06911; H04L 29/06877; H04L 43/16; H04L 63/101; H04L 63/20; G06F 2221/2119; G06F 2201/875; G06F 21/55; G06F 9/50; G06F 21/56; G06F 21/561; G06F 21/562; G06F 21/563; G06F 16/90344; G06F 21/554; G06F 21/552

USPC ........................................................ 726/23
See application file for complete search history.

(56) References Cited

U.S. PATENT DOCUMENTS

| | | | | |
|---|---|---|---|---|
| 8,185,956 | B1 * | 5/2012 | Bogorad | H04L 63/105 726/25 |
| 8,903,941 | B1 * | 12/2014 | Kaul | G06F 21/54 709/203 |

(Continued)

OTHER PUBLICATIONS

DSM, Cryptojacking: The Threat, Detection, and Prevention, Aug. 23, 2008, pp. 1-7. (Year: 2008).*

(Continued)

*Primary Examiner* — Luu T Pham
*Assistant Examiner* — Jenise E Jackson
(74) *Attorney, Agent, or Firm* — Patent Capital Group

(57) ABSTRACT

Particular embodiments described herein provide for a system that can be configured to identify cryptomining malware. The electronic device can be configured to identify a website, determine one or more uniform resource locators associated with the website, determine scripts associated with the website, obtain a string format of each of the determined scripts associated with the website, analyze each of the of the string formats to determine if a specific script is related to malware, and block the website if the specific script is related to malware. In an example, the system can also be configured to determine if usage of the computer processing unit and/or system resources increase more than a threshold amount during access to the website and send the one or more uniform resource locators associated with the website to a network security engine for further analysis.

16 Claims, 12 Drawing Sheets

(56) References Cited

U.S. PATENT DOCUMENTS

| | | | |
|---|---|---|---|
| 9,398,032 B1* | 7/2016 | Wan | G06F 21/566 |
| 2009/0049010 A1* | 2/2009 | Bodapati | G06F 16/951 |
| 2015/0200961 A1* | 7/2015 | Landa | H04L 63/0807 |
| | | | 726/23 |
| 2015/0356524 A1* | 12/2015 | Pennanen | G06Q 20/4012 |
| | | | 705/71 |
| 2016/0164714 A1* | 6/2016 | Sadaphal | H04L 41/064 |
| | | | 709/224 |
| 2017/0339165 A1* | 11/2017 | Be'ery | H04L 63/14 |
| 2018/0012256 A1* | 1/2018 | Napchi | G06Q 30/0257 |
| 2018/0139180 A1* | 5/2018 | Napchi | G06F 21/554 |
| 2019/0243970 A1* | 8/2019 | Vinogradov | G06F 21/53 |
| 2019/0364057 A1* | 11/2019 | Hazay | H04L 63/145 |

OTHER PUBLICATIONS

Mansoori et al, Empirical Analysis of Impact of HTTP Refereron Malicious Website Behavior and Delivery, IEEE, Mar. 25, 2016, pp. 941-948. (Year: 2016).*

Mursch, How to Find Cryptojacking Malware, Feb. 7, 2018, pp. 1-7. (Year: 2018).*

* cited by examiner

IDENTIFICATION OF MALWARE

TECHNICAL FIELD

This disclosure relates in general to the field of information security, and more particularly, to the identification of malware.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. One specific type of malware commonly referred to as cryptomining involves taking over a computer's resources without a user's explicit permission and using the resources for cryptocurrency mining. Hence, significant administrative challenges remain for protecting computers and computer networks from malicious and inadvertent exploitation by malicious software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EMBODIMENTS

The following detailed description sets forth examples of apparatuses, methods, and systems relating to a system to help facilitate the identification of malware in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
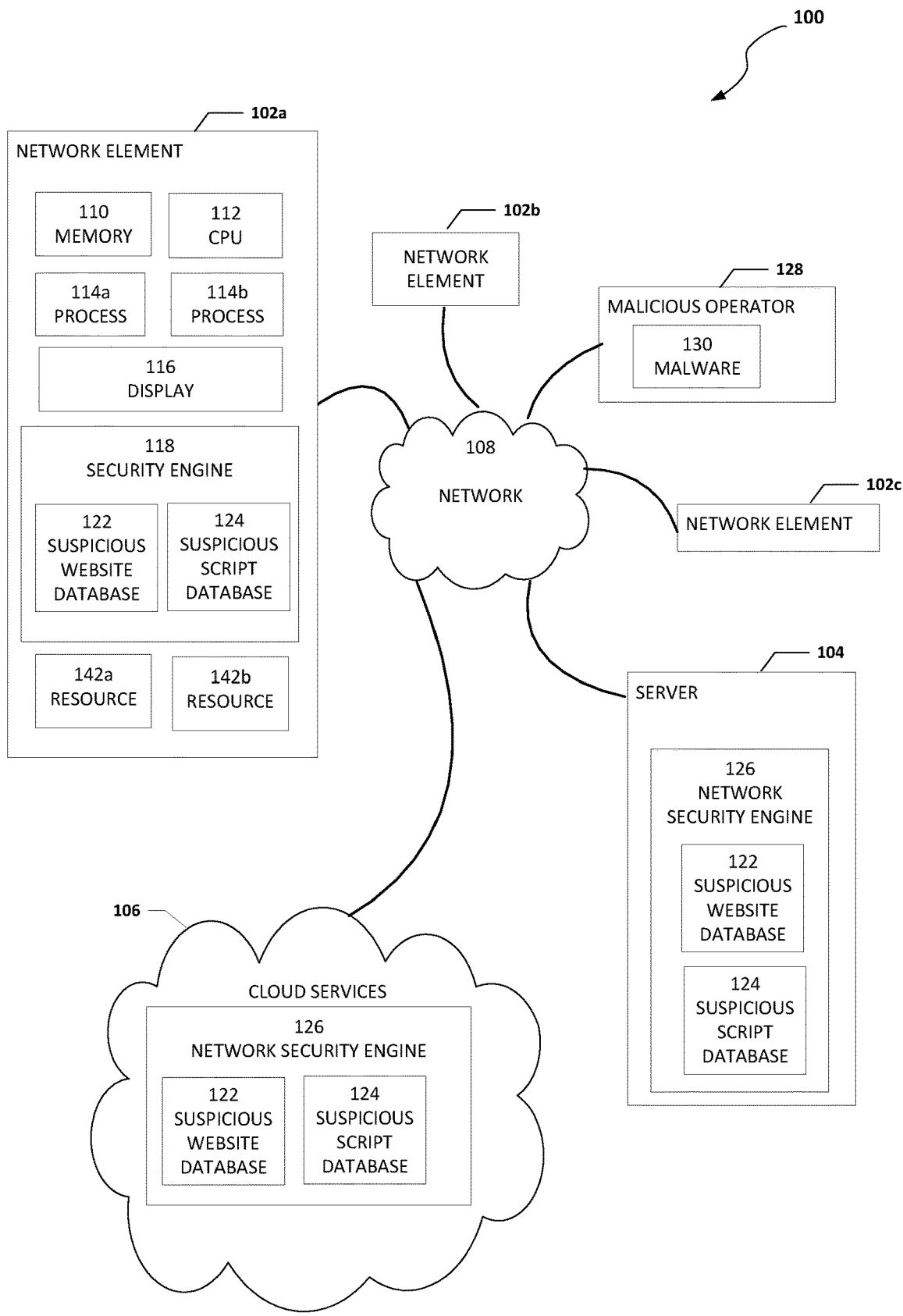
FIG. 1 is a simplified block diagram of a system to help facilitate the identification of malware in accordance with an embodiment of the present disclosure.

FIG. 1 is a simplified block diagram of a system 100 to help facilitate the identification of malware in accordance with an embodiment of the present disclosure. As illustrated in FIG. 1, an embodiment of system 100 can include network elements 102*a*-102*c*, a server 104, and cloud services 106. Network elements 102*a*-102*c*, server 104, and cloud services 106 may be in communication with each other using network 108.

Each network element 102*a*-102*c* can include memory, a computer processing unit (CPU), one or more processes, a security engine, and one or more resources. For example, as illustrated in FIG. 1, network element 102*a* includes memory 110, one or more CPUs 112, one or more processes 114*a* and 114*b*, a display 116, a security engine 118, and one or more resources 142a and 142b. Security engine 118 can include a suspicious website database 122 and a suspicious script database 124. Each of processes 114a and 114b may be a computer program, function, virtual network function (VNF), etc. Server 104 and cloud services 106 can each include a network security engine 126. Network security engine 126 can include suspicious website database 122 and suspicious script database 124.

In an example, a malicious operator 128 may be in communication with network 108 and one or more of network element 102a-102c. Malicious operator 128 can include malware 130. Malware 130 may be cryptomining malware or some other malware that can take over a computer's resources (e.g., CPU 112, resources 142a and 142b, etc.) without a user's explicit permission and use the resources without the user's explicit permission and/or for nefarious purposes. Each of resources 142a and 142b may be any physical or virtual component of limited availability within network element 102a that malware may use without a user's permission. More specifically, each of resources 142a and 142b may be random access memory (RAM), a processor, a secondary processing unit such as a graphics card, cache space, network connections, etc.

Security engine 118 can be configured to identify malware 130. For example, as a user navigates to a website, security engine 118 can determine if the website includes malware 130. More specifically, security engine 118 can be configured to identify the website and determine if the website or Uniform Resource Locator (URL) associated with the website matches an entry in suspicious website database 122. In addition, security engine can be configured to identify scripts on the website and determine if any of the scripts match an entry in suspicious script database 124. Further, security engine can be configured to analyze the script to determine if the script is related to malware or includes characteristics of malware. More specifically, security engine 118 can be configured to determine a string format (e.g., string version) for a script and analyze the string format of the script to determine if the script is related to malware. In addition, security engine 118 can monitor the usage of CPU 112 and resources 142a and 142b to determine if the usage of CPU 112 and/or resources 142a and 142b of network element 102a spike or exceed a threshold. The threshold provides an indication of the spike and the threshold may be as much as ninety percent capacity or more of CPU 112 and/or of resources 142a and 142b being used or a percentage increase of usage (e.g., a ninety-five percent increase in usage) of CPU 112 and/or resources 142a and 142b. A spike in the usage of CPU 112 and/or resources 142a and 142b of network element 102a can be an indication of cryptomining malware. In an example, security engine 118 can be configured to determine what process or processes cause the spike (e.g., the browser caused the spike vs a CPU and/or resource intensive video editing process caused the spike) to help determine false positives.

Elements of FIG. 1 may be coupled to one another through one or more interfaces employing any suitable connections (wired or wireless), which provide viable pathways for network (e.g., network 108) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

For purposes of illustrating certain example techniques of system 100, it is important to understand the communications that may be traversing the network environment. The following foundational information may be viewed as a basis from which the present disclosure may be properly explained.

Malicious software ("malware") that infects a host computer may be able to perform any number of malicious actions, such as stealing sensitive information from a business or individual associated with the host computer, propagating to other host computers, assisting with distributed denial of service attacks, sending out spam or malicious emails from the host computer, etc. Hence, significant administrative challenges remain for protecting computers and computer networks from malicious and inadvertent exploitation by malicious software and devices. One way malicious operators can infect a host computer is to use cryptomining malware.

Cryptomining malware (or cryptocurrency mining malware, cryptojacking, etc.), is a relatively new term that refers to software programs and malware components developed to take over a computer's resources and use them for cryptocurrency mining without a user's explicit permission. Cyber criminals have increasingly turned to cryptomining malware as a way to harness the processing power of large numbers of computers, smartphones, and other electronic devices to help them generate revenue from cryptocurrency mining. In addition to malware designed to mine cryptocurrency, cyber criminals have also increasingly turned to browser-based cryptocurrency mining to help them generate revenue from mining.

Through the use of browser-injected mining scripts, users become unwilling participants the moment they load a compromised website. The website can include scripts that run in the background, which makes them extremely difficult to detect. For some scripts, the users cannot tell when the scripts are running and the scripts only run for as long as the user is on the website. However, some scripts allow the mining to continue even after the website has been closed by creating a hidden pop-up window. The hidden pop-up window can be hidden from the user's view such as sized to fit under a taskbar. The malware can tap into the resources of the user's computers and cause a degradation in computer performance and components. What is needed is a system and method to help identify malware, especially cryptomining malware.

A system and method to identify malware, as outlined in FIG. 1 can resolve these issues (and others). Using security engine 118, system 100 can be configured to analyze a website and determine if the website and/or any scripts associated with the website are in a blacklist (e.g., suspicious website database 122 and/or suspicious script database 124). If the website and/or any scripts associated with the website are not found in a blacklist, security engine 118 can analyze the scripts and determine if the scripts are related to malware.

For example, security engine 118 can identify script tags for each script associated with the website and acquire a string format of the script. An analysis on the string format of the script can be performed to help determine if the script and/or website is associated with malware. More specifically, security engine 118 can identify script tags for each script associated with the website and acquire a string format of the script using an Extensible Markup Language/Hypertext Transfer Protocol (XML/HTTP) request. Then, a regular expression (REGEX) analysis can be performed on the string format of the script to help determine if the script and/or website is associated with malware. In addition, usage of the CPU (e.g., CPU 112) and/or system resources (e.g., resources 142a and 142b) can be monitored to determine if the usage of the CPU and/or resources spike during browsing of the website. If usage of the CPU and/or resources spike, the website and/or scripts related to the website can be reported to a network security engine to determine if the website and/or scripts related to the website are related to malware.

In an illustrated example, security engine 118 can be configured to identify a website and identify scripts associated with the website. The scripts can be identified using a webextension application programming interface (API) (e.g., WebRequest listener, MutationObserver, etc.). The webextension API can be used to identify scripts on the website as well as monitor http/https requests for websites that try to load a script from another source. Security engine 118 can also be configured to obtain script tags in each of the scripts associated with the website. The script tags can be acquired using an XML/HTTP request object to request data from a server. A responseText property returns the response as a string and the sting can be analyzed using REGEX.

Generally, REGEX, sometimes referred to as a rational expression, is sequence of characters that define a search pattern. The pattern is then used by string searching algorithms to find operations on strings. Each character in a REGEX (that is, each character in the string describing its pattern) is either a metacharacter, having a special meaning, or a regular character that has a literal meaning. For example, in the REGEX "a.," "a" is a literal character that matches just 'a', while "." is a meta character that matches every character except a newline. Therefore, the REGEX "a." matches, for example, "a", or "ax", or "a0". Together, metacharacters and literal characters can be used to identify text of a given pattern and can be used to identify malware. Pattern matches may vary from a precise equality to a very general similarity, as controlled by the metacharacters.

Turning to the infrastructure of FIG. 1, system 100 in accordance with an example embodiment is shown. Generally, system 100 can be implemented in any type or topology of networks. Network 108 represents a series of points or nodes of interconnected communication paths for receiving and transmitting packets of information that propagate through system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

Network elements 102a-102c can each be a desktop computer, laptop computer, mobile device, personal digital assistant, smartphone, tablet, network appliances, servers, routers, switches, gateways, bridges, load balancers, or any other suitable device, component, element, or object operable to exchange information in a network environment. Server 104 can be a network element such as a server or virtual server and can be associated with clients, customers, endpoints, or end users wishing to initiate a communication in system 100 via some network (e.g., network 108). The term 'server' is inclusive of devices used to serve the requests of clients and/or perform some computational task on behalf of clients within system 100. Cloud services 106 is configured to provide cloud services to network elements 102a-102c. Cloud services may generally be defined as the use of computing resources that are delivered as a service over a network, such as the Internet. Typically, compute, storage, and network resources are offered in a cloud infrastructure, effectively shifting the workload from a local network to the cloud network. Network elements 102a-102c may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with system 100, each of network element 102a-102c, server 104, and cloud services 106 can include memory elements (e.g., memory 110) for storing information to be used in the operations outlined herein. Each of network elements 102a-102c, server 104, and cloud services 106 may keep information in any suitable memory element (e.g., disk, random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of system 100, such as network elements 102a-102c, server 104, and cloud services 106 may include software modules (e.g., security engine 118, network security engine 126, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of network elements 102a-102c, server 104, and cloud services 106 may include a processor (e.g., CPU 112) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 2:
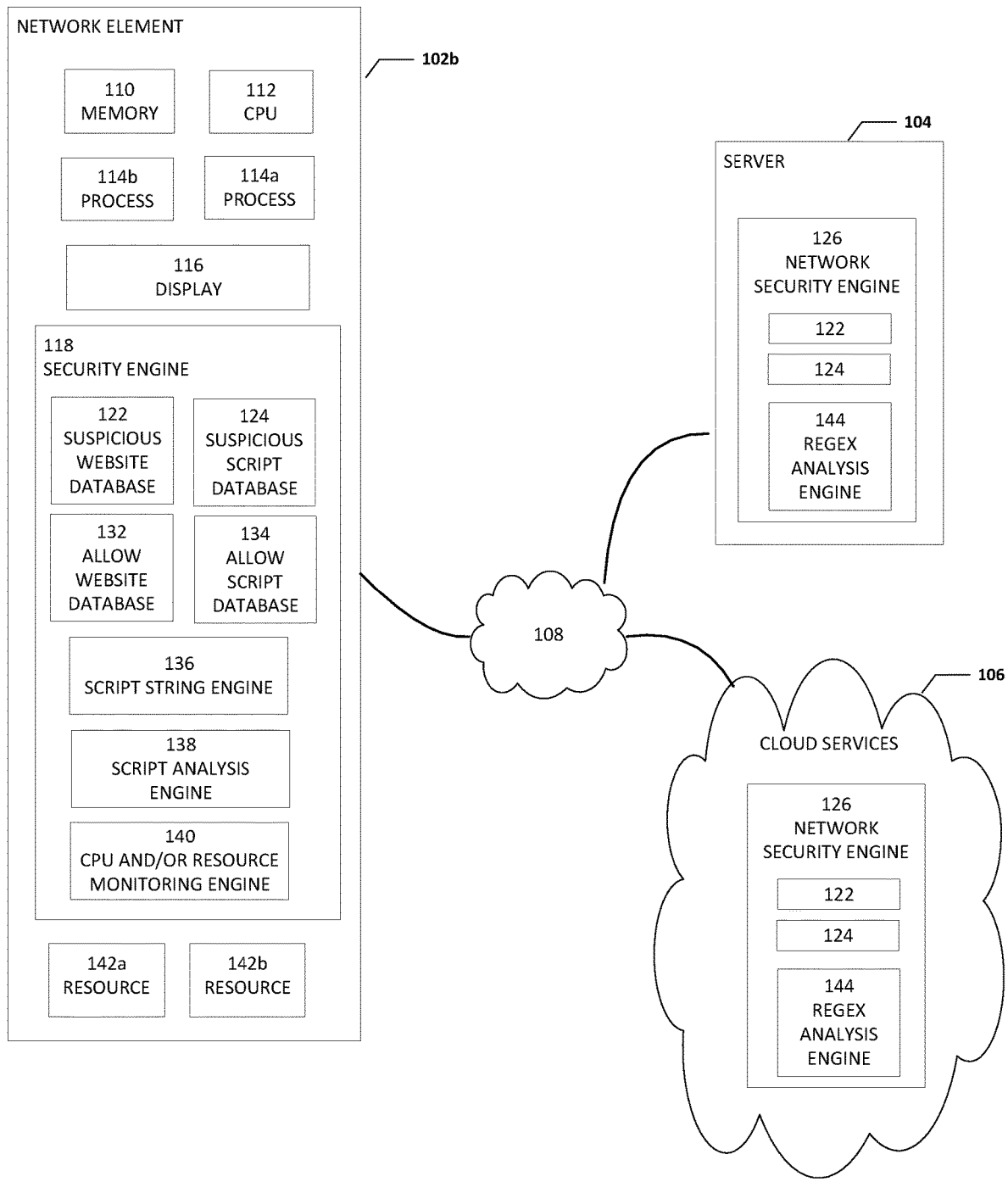
FIG. 2 is a simplified block diagram of a portion of a to help facilitate the identification of malware in accordance with an embodiment of the present disclosure.

Turning to FIG. 2, FIG. 2 is a simplified block diagram of a portion of a system 100 to help facilitate the identification of malware in accordance with an embodiment of the present disclosure. In an example, network element 102b can include memory 110, CPU 112, processes 114a and 114b, display 116, security engine 118, and resources 142a and 142b. Security engine 118 can include suspicious website database 122, suspicious script database 124, an allow website database 132, an allow script database 134, a script string engine 136, a script analysis engine 138, and a CPU and/or resource monitoring engine 140. Server 104 and cloud services 106 can include network security engine 126. Network security engine 126 can include suspicious website database 122, suspicious script database 124, and REGEX analysis engine 144. REGEX analysis engine 144 can be configured to determine if a REGEX can identify a suspicious script and to create one or more REGEXs to identify a suspicious script.

Allow website database 132 can include whitelisted websites or websites allowed by a user. In an example, a website in allow website database 132 will be allowed even if the website is listed in suspicious website database 122 or is deemed suspicious by security engine 118. Allow script database 134 can include whitelisted scripts or scripts allowed by a user. In an example, a script in allow script database 134 will be allowed even if the script is listed in suspicious script database 124 or is deemed suspicious by security engine 118.

Script string engine 136 can be configured to identify script tags for each script associated with the website and acquire a string format of the script. More specifically, script string engine 136 can identify script tags for each script associated with the website and acquire a string format of the script using an XML/HTTP request. Script analysis engine 138 can be configured to analyze the string format of the script to help determine if the script and/or website is associated with malware. More specifically, script analysis engine 138 can be configured to perform a REGEX analysis on the string format of the script to help determine if the script and/or website is associated with malware. CPU and/or resource monitoring engine 140 can be configured to monitor CPU 112 and/or resources 142a and 142b to determine if the usage of CPU 112 and/or resources 142a and 142b spike during browsing of the website. If the usage of CPU 112 and/or resources 142a and 142b spike, the website and/or scripts related to the website can be reported to a network security engine to determine if the website and/or scripts related to the website are related to malware. REGEX analysis engine 144 can be configured to analyze a script related to malware and determine if a REGEX can be used to detect the script. If the REGEX cannot be used to detect the script, then REGEX analysis engine 144 can be used to create a REGEX that can be used to detect the script. In an example, an administrator may analyze a script related to malware and determine if a REGEX can be used to detect the script. If the REGEX cannot be used to detect the script, then the administrator can create a REGEX that can be used to detect the script.

Figure 3:
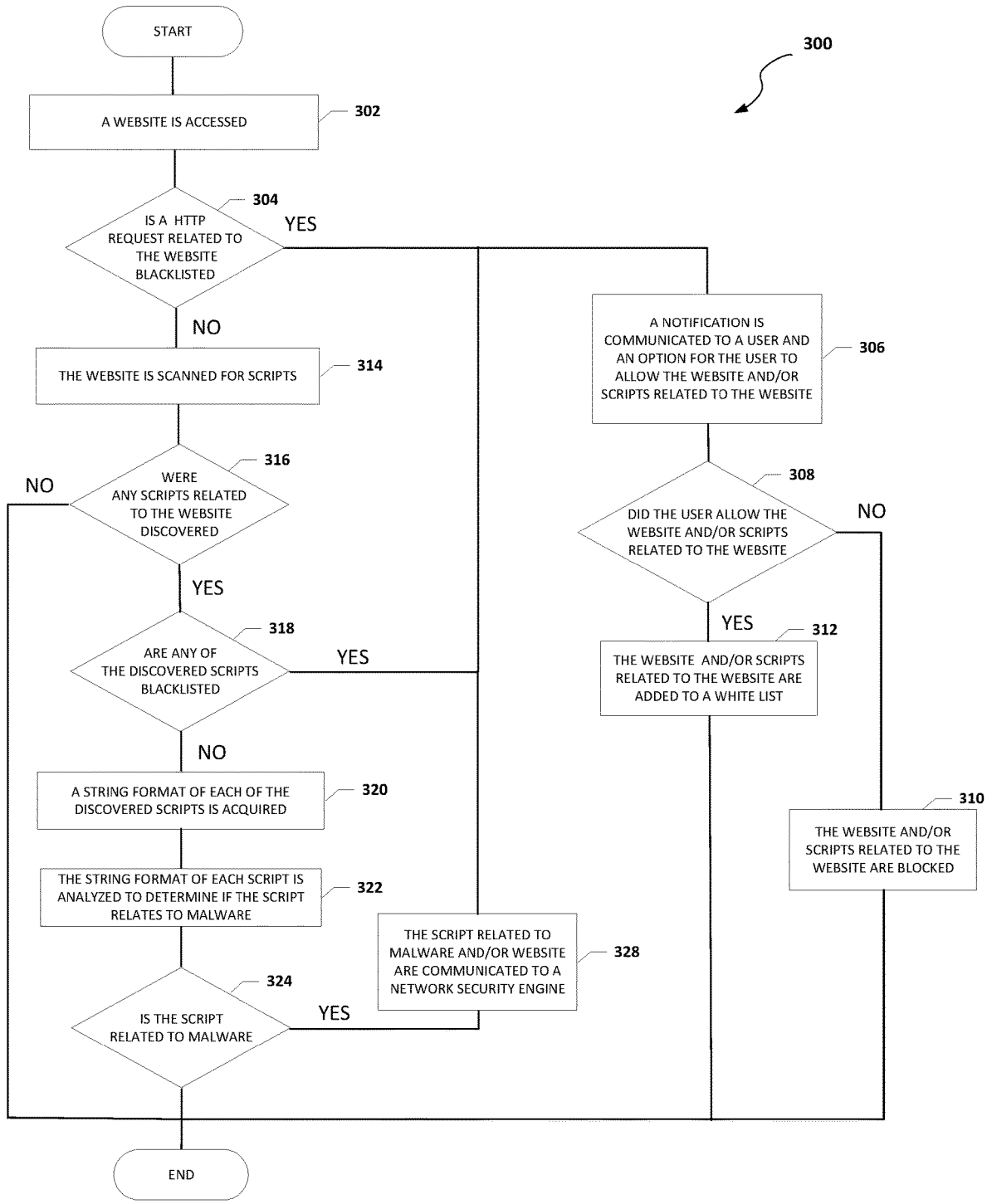
FIG. 3 is a simplified flowchart illustrating potential operations that may be associated with the system in accordance with an embodiment.

Turning to FIG. 3, FIG. 3 is an example flowchart illustrating possible operations of a flow 300 that may be associated with the identification of malware, in accordance with an embodiment. In an embodiment, one or more operations of flow 300 may be performed by security engine 118, script string engine 136, script analysis engine 138, CPU and/or resource monitoring engine 140, and REGEX analysis engine 144. At 302, a website is accessed. At 304, the system determines if an HTTP request related to the website is blacklisted. For example, the system can determine if an HTTP request includes an entry in suspicious website database 122. If an HTTP request related to the website is blacklisted, then a notification is communicated to a user as well as an option for the user to allow the website and/or scripts related to the website, as in 306. At 308, the system determines if the user allowed the website and/or scripts related to the website. If the user did not allow the website and/or scripts related to the website, then the website and/or scripts related to the website are blocked, as in 310. If the user did allow the website and/or scripts related to the website, then the website and/or scripts related to the website are added to a while list, as in 312. For example, the website can be added to allow website database 132.

Going back to 304, if an HTTP request related to the website is not blacklisted, then the website is scanned for scripts, as in 314. At 316, the system determines if any scripts related to the website were discovered. If no scripts related to the website were discovered, then the process ends. If scripts related to the website were discovered, then the system determines if any of the discovered scripts are blacklisted, as in 318. For example, the system can determine if any of the scripts match an entry in suspicious script database 124. If any of the discovered scripts are blacklisted, then a notification is communicated to a user along with an option for the user to allow the website and/or scripts related to the website, as in 306. If any of the discovered scripts are not blacklisted, then a string format of each of the discovered scripts is acquired, as in 320. At 322, the string format of each script is analyzed to determine if the script relates to malware. At 324, the system determines if the script is related to malware. If the script is not related to malware, then the process ends. If the script is related to malware, then the script related to malware and/or the website are communicated to a network security engine, as in 328. At 306, a notification is communicated to a user along with an option for the user to allow the website and/or scripts related to the website.

Figure 4:
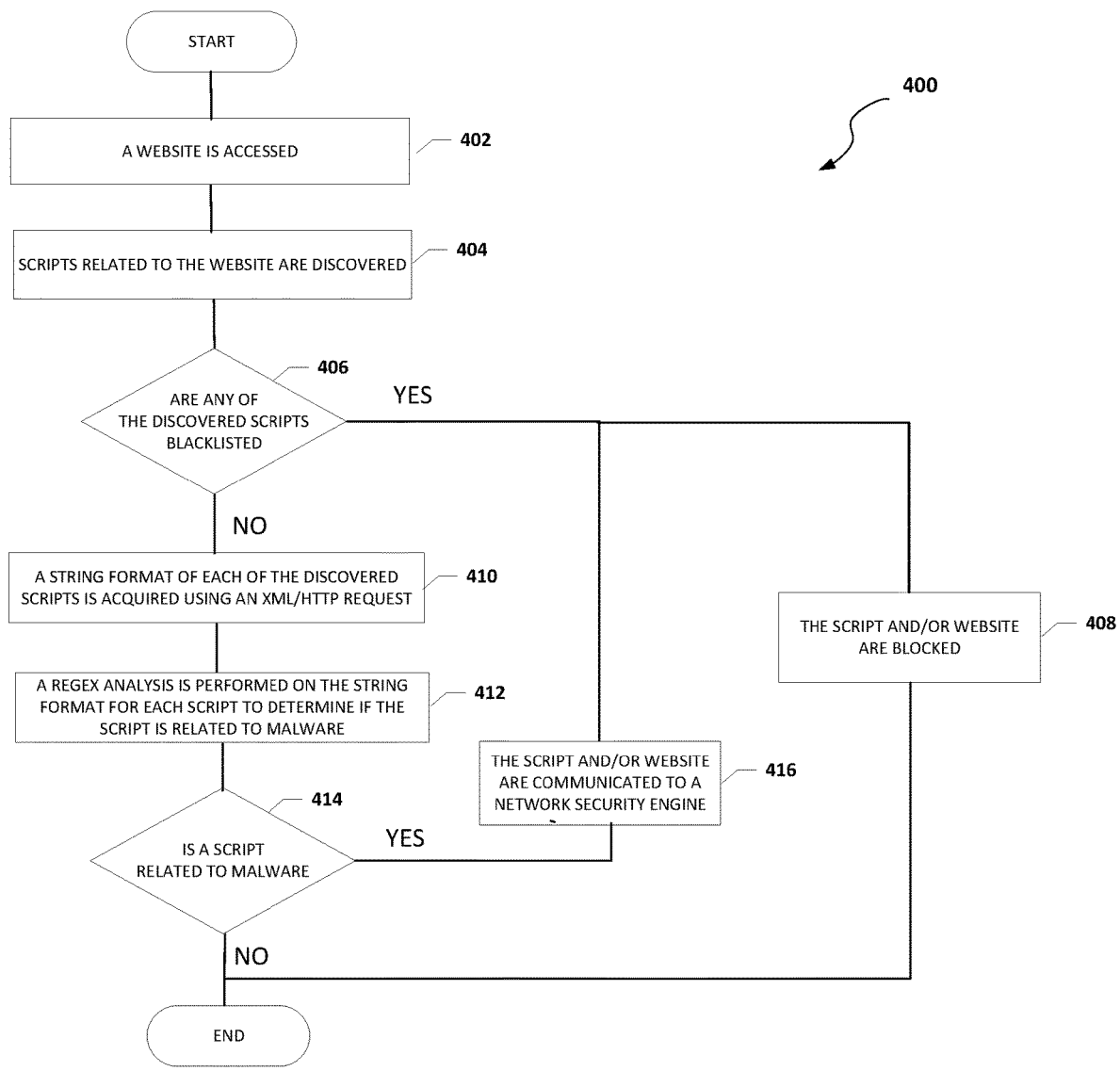
FIG. 4 is a simplified flowchart illustrating potential operations that may be associated with the system in accordance with an embodiment.

Turning to FIG. 4, FIG. 4 is an example flowchart illustrating possible operations of a flow 400 that may be associated with the identification of malware, in accordance with an embodiment. In an embodiment, one or more operations of flow 400 may be performed by security engine 118, script string engine 136, script analysis engine 138, CPU and/or resource monitoring engine 140, and REGEX analysis engine 144. At 402, a website is accessed. At 404, a string format of scripts for the website are discovered. For example, the scripts can be discovered by using a webextension API (e.g., WebRequest listener, MutationObserver, etc.). At 406, the system determines if any of the discovered scripts are blacklisted. For example, the system can determine if any of the scripts match an entry in suspicious script database 124. If any of the discovered scripts are blacklisted, then the script and/or website are blocked, as in 408. If any of the discovered scripts are not blacklisted, then a string format of each of the discovered scripts is acquired using an XML/HTTP request, as in 410. At 412, a REGEX analysis is performed on the string format for each script to determine if the script is related to malware. At 414, the system determines if a script is related to malware. If a script is not related to malware, then the process ends. If a script is related to malware, then the script and/or website are communicated to a network security engine, as in 416. At 408, the script and/or website are blocked.

Figure 5:
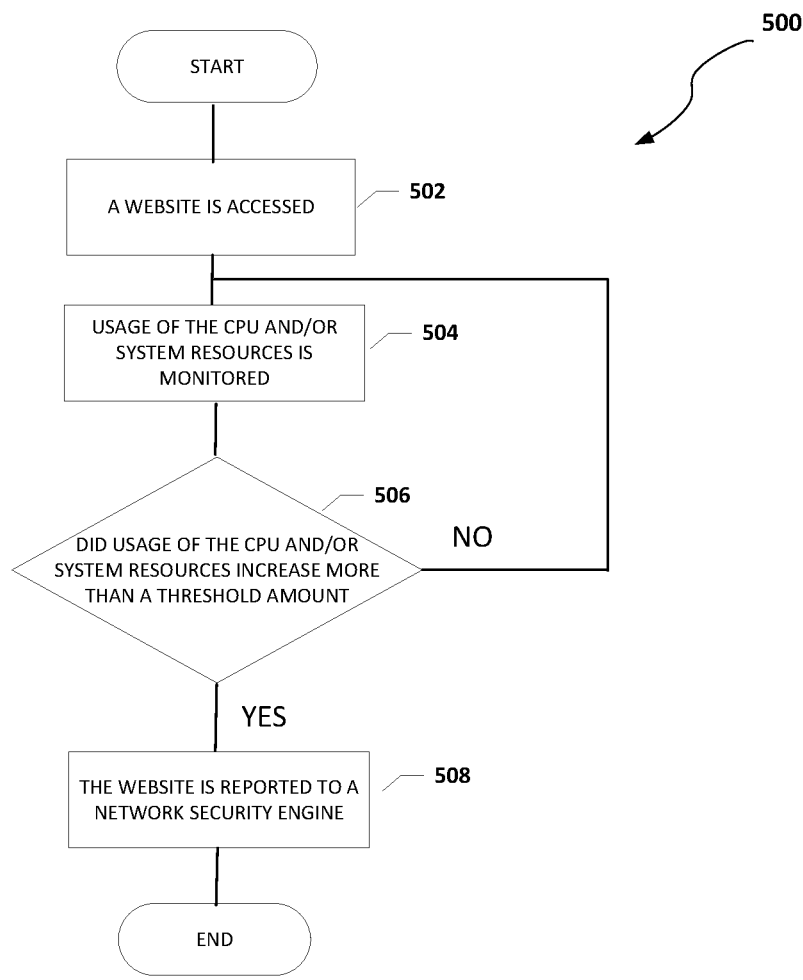
FIG. 5 is a simplified flowchart illustrating potential operations that may be associated with the system in accordance with an embodiment.

Turning to FIG. 5, FIG. 5 is an example flowchart illustrating possible operations of a flow 500 that may be associated with the identification of malware, in accordance with an embodiment. In an embodiment, one or more operations of flow 500 may be performed by security engine 118, script string engine 136, script analysis engine 138, CPU and/or resource monitoring engine 140, and REGEX analysis engine 144. At 502, a website is accessed. At 504, usage of the CPU and/or system resources is monitored. At 506, the system determines if usage of the CPU and/or system resources increase more than a threshold amount. If usage of the CPU and/or system resources increase more than a threshold amount, then the website is reported to a network security engine for further analysis, as in 508. If usage of the CPU and/or system resources did not increase more than a threshold amount, then usage of the CPU and/or system resources continues to be monitored, as in 504. The threshold amount can be set by the user or an administrator and may be over ninety percent usage of the CPU and/or system resources.

Figure 6:
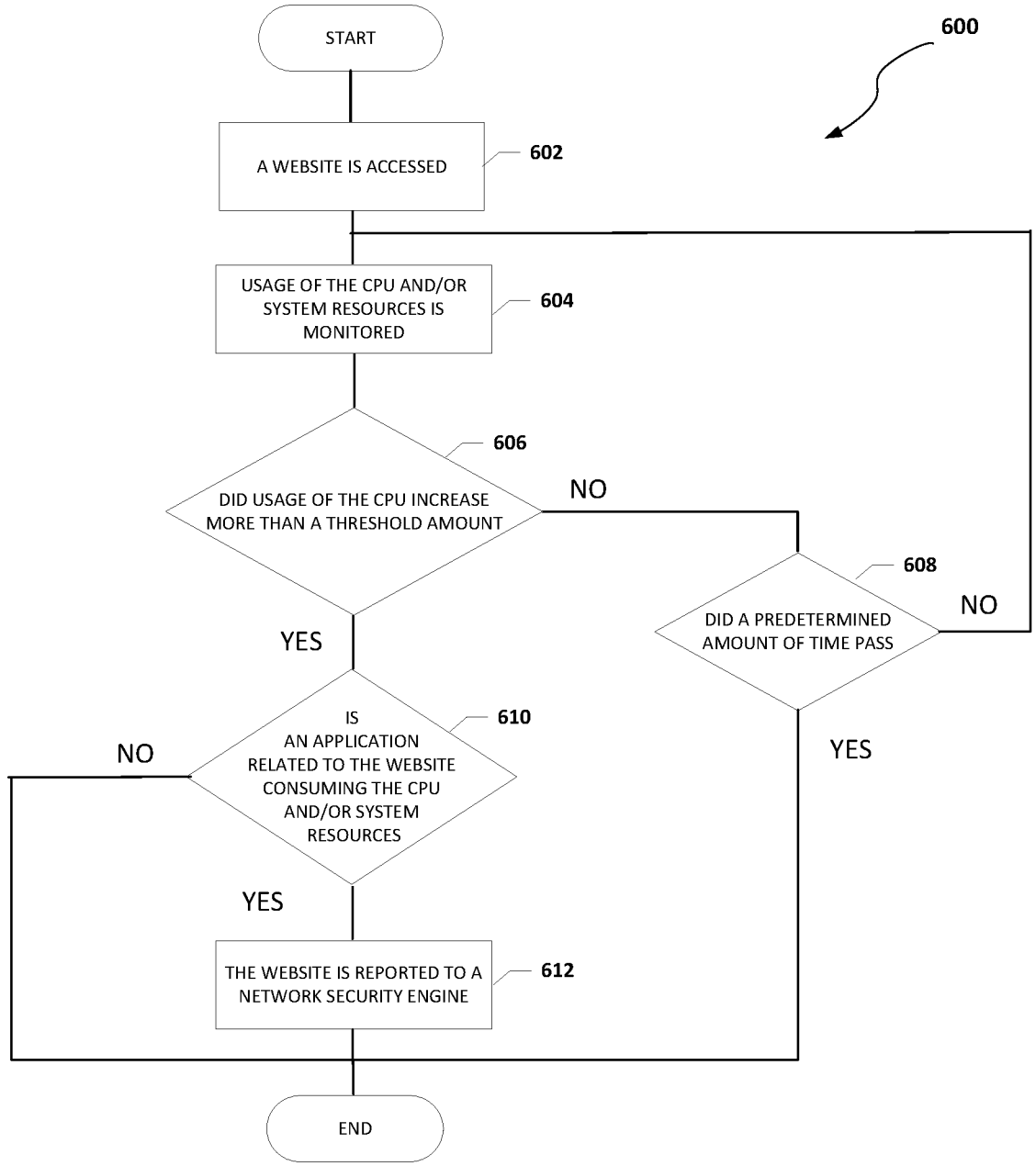
FIG. 6 is a simplified flowchart illustrating potential operations that may be associated with the system in accordance with an embodiment.

Turning to FIG. 6, FIG. 6 is an example flowchart illustrating possible operations of a flow 600 that may be associated with the identification of malware, in accordance with an embodiment. In an embodiment, one or more operations of flow 600 may be performed by security engine 118, script string engine 136, script analysis engine 138, CPU and/or resource monitoring engine 140, and REGEX analysis engine 144. At 602, a website is accessed. At 604, usage of the CPU and/or system resources are monitored. At 606, the system determines if usage of the CPU and/or system resources increase more than a threshold amount. If usage of the CPU and/or system resources did not increase more than a threshold amount, then the system determines if a predetermined amount of time has passed, as in 608. If a predetermined amount of time has passed, then the process ends. If a predetermined amount of time has not passed, then usage of the CPU and/or system resources continues to be monitored, as in 604. The predetermined amount of time can be set by the user or an administrator and may be one minute, three minutes, five minutes, etc. Generally, websites with cryptomining malware will begin using the CPU and/or system resources relatively quickly to gain the most benefit from the CPU and/or system resources.

Going back to 606, if the CPU and/or system resources did increase more than a threshold amount, then the system determines if an application related to the website is consuming the CPU and/or system resources, as in 610. If an application not related to the website (e.g., a video editing application or some other CPU and/or system resources intensive application not related to the website) is consuming the CPU and/or system resources, then the process ends. If an application related to the website (e.g., a web browser) is consuming the CPU and/or system resources, then the website is reported to a network security engine for further analysis, as in 612.

Figure 7:
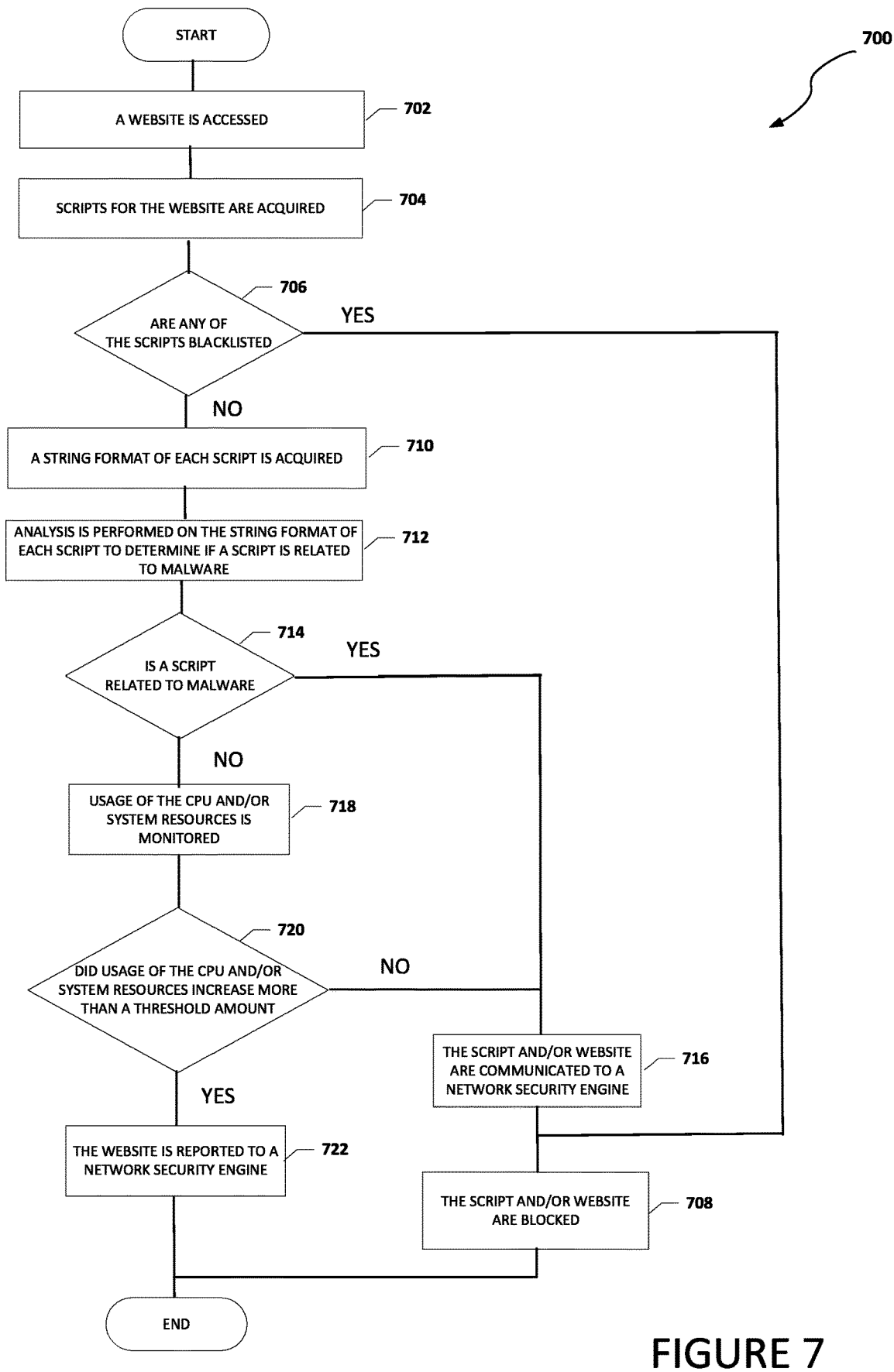
FIG. 7 is a simplified flowchart illustrating potential operations that may be associated with the system in accordance with an embodiment.

Turning to FIG. 7, FIG. 7 is an example flowchart illustrating possible operations of a flow 700 that may be associated with the identification of malware, in accordance with an embodiment. In an embodiment, one or more operations of flow 700 may be performed by security engine 118, script string engine 136, script analysis engine 138, CPU and/or resource monitoring engine 140, and REGEX analysis engine 144. At 702, a website is accessed. At 704, scripts for the website are acquired. At 706, the system determines if any of the discovered scripts are blacklisted. For example, the system can determine if any of the scripts match an entry in suspicious script database 124. If any of the scripts are blacklisted, then the script and/or website are blocked, as in 708. If any of the scripts are not blacklisted, then a string format of each script is acquired, as in 710. At 712, analysis is performed on the string format of each script to determine if a script is related to malware. At 714, the system determines if a script is related to malware. If a script is related to malware, then the script and/or website are communicated to a network security engine, as in 716. At 708, the script and/or website are blocked. If a script is not related to malware, then usage of the CPU and/or system resources are monitored, as in 718. At 720, the system determines if usage of the CPU and/or system resources increase more than a threshold amount. If usage of the CPU and/or system resources did not increase more than a threshold amount, then usage of the CPU and/or system resources continue to be monitored, as in 718. If usage of the CPU and/or system resources did increase more than a threshold amount, then the website is reported to a network security engine for further analysis, as in 722.

Figure 8:
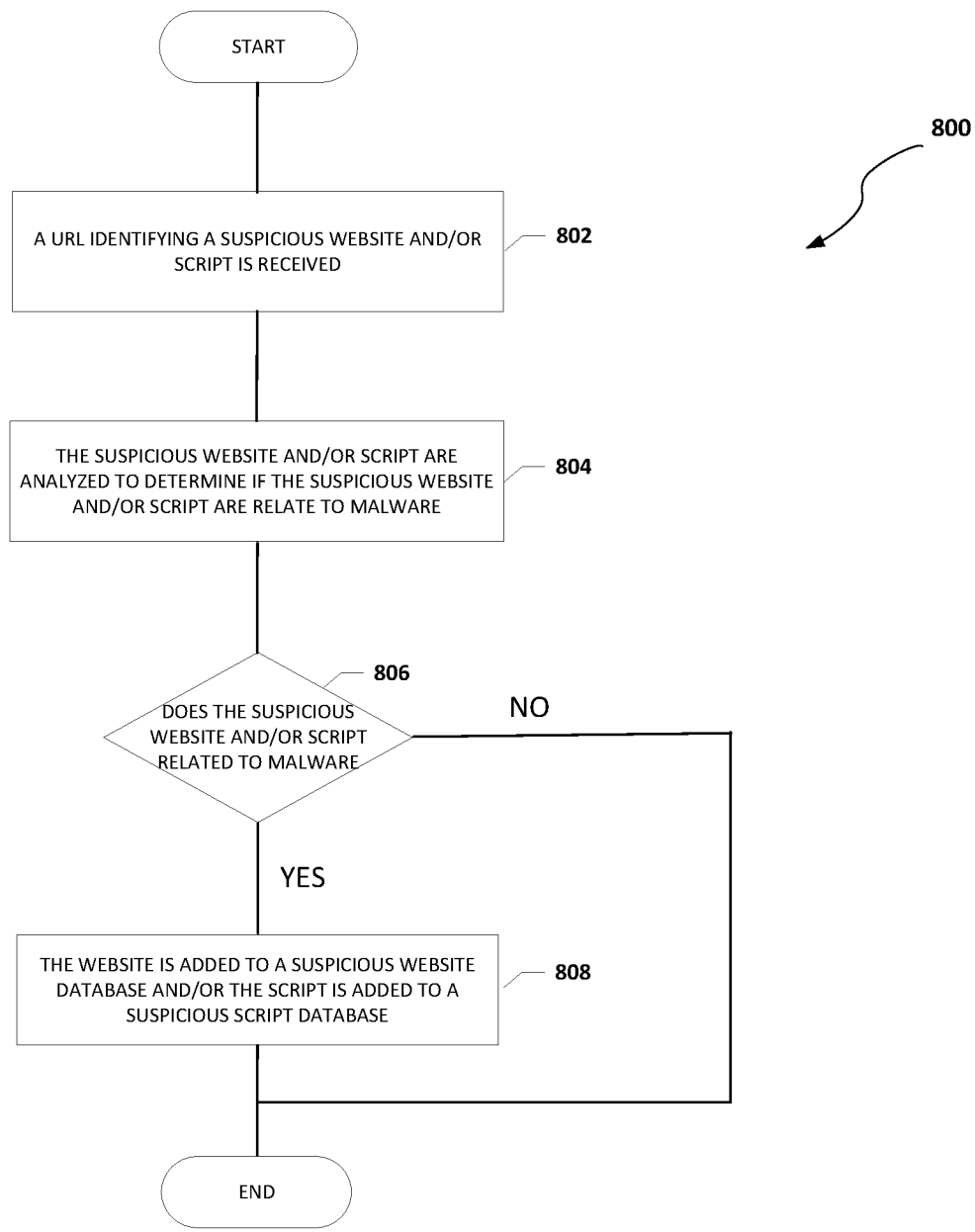
FIG. 8 is a simplified flowchart illustrating potential operations that may be associated with the system in accordance with an embodiment.

Turning to FIG. 8, FIG. 8 is an example flowchart illustrating possible operations of a flow 800 that may be associated with the identification of malware, in accordance with an embodiment. In an embodiment, one or more operations of flow 800 may be performed by security engine 118, script string engine 136, script analysis engine 138, CPU and/or resource monitoring engine 140, and REGEX analysis engine 144. At 802, a URL identifying a suspicious website and/or script is received. At 804, the suspicious website and/or script are analyzed to determine if the suspicious website and/or script are related to malware. At 806, the system determines if the suspicious website and/or script are related to malware. If the suspicious website and/or script are related to malware, then the website is added to a suspicious website database and/or the script is added to a suspicious script database, as in 808.

Figure 9:
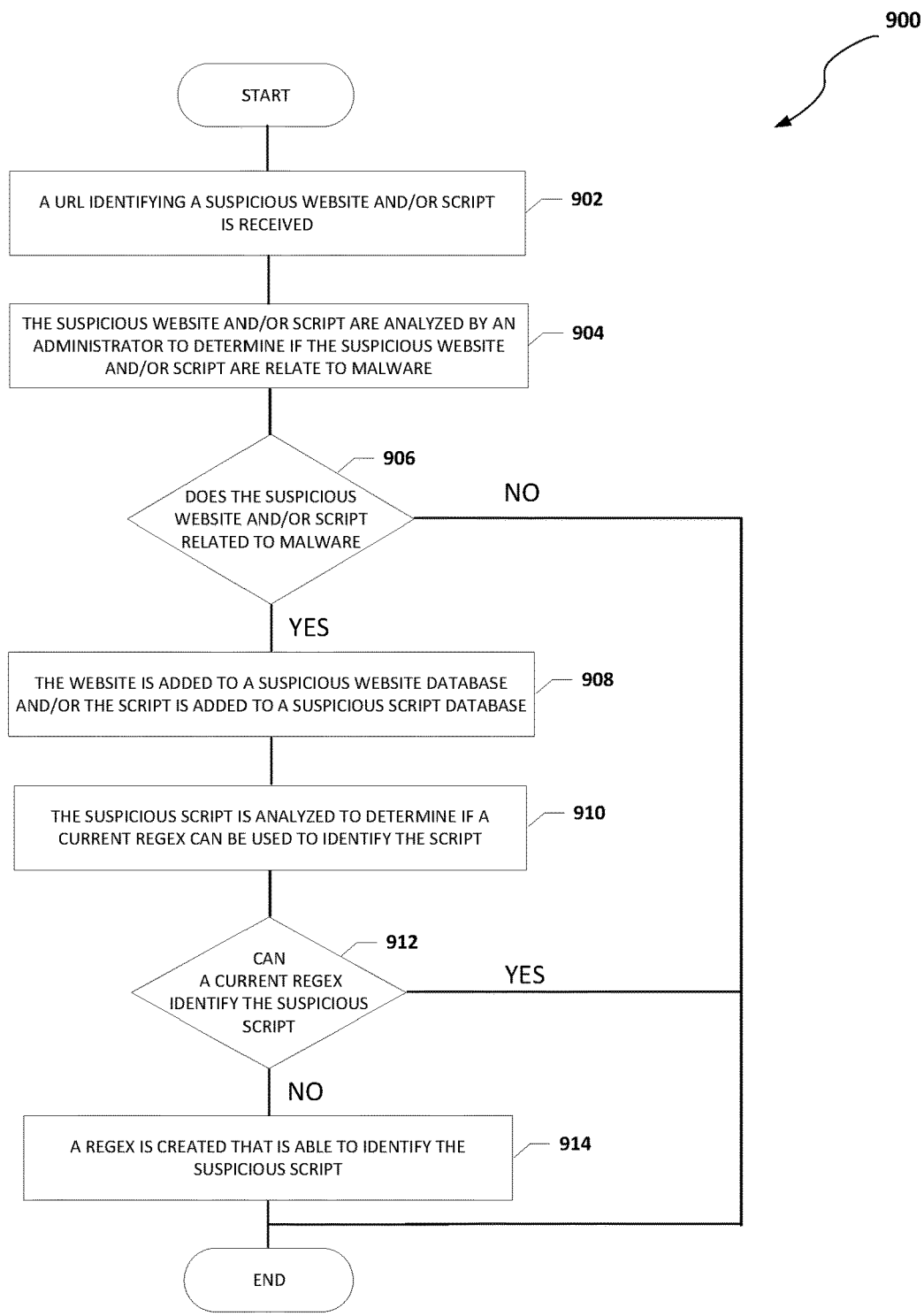
FIG. 9 is a simplified flowchart illustrating potential operations that may be associated with the system in accordance with an embodiment.

Turning to FIG. 9, FIG. 9 is an example flowchart illustrating possible operations of a flow 900 that may be associated with the identification of malware, in accordance with an embodiment. In an embodiment, one or more operations of flow 900 may be performed by security engine 118, script string engine 136, script analysis engine 138, CPU and/or resource monitoring engine 140, and REGEX analysis engine 144. At 902, a URL identifying a suspicious website and/or script is received. At 904, the suspicious website and/or script are analyzed by an administrator to determine if the suspicious website and/or script are related to malware. At 906, the system (or an administrator) determines if the suspicious website and/or script are related to malware. For example, an administrator can navigate to the website and investigate the website and scripts associated with the website to determine if the website and/or script are related to malware. If the suspicious website and/or script are not related to malware, then the process ends. In an example, the administrator may add the website and/or scripts to a clean database. For example, the website can be added to allow website database 132 and the scripts can be added to allow script database 134.

If the suspicious website and/or script are related to malware, then the website is added to a suspicious website database and/or the script is added to a suspicious script database, as in 908. At 910, the suspicious script is analyzed to determine if a current REGEX can be used to identify the script. At 912, the system (or an administrator) determines if a current REGEX can be used to identify the script. If the system (or administrator) determines a current REGEX can be used to identify the script, then the process ends. In an example, a check can be performed to ensure that the network element that sent the URL identifying the suspicious website and/or script has an updated REGEX to identify the suspicious website and/or script. If the system (or administrator) determines a current REGEX cannot be used to identify the script, then a REGEX is created that is able to identify the suspicious script, as in 914. In an example, the created REGEX is communicated to network elements to help the network elements identify suspicious websites and/or scripts.

Figure 10:
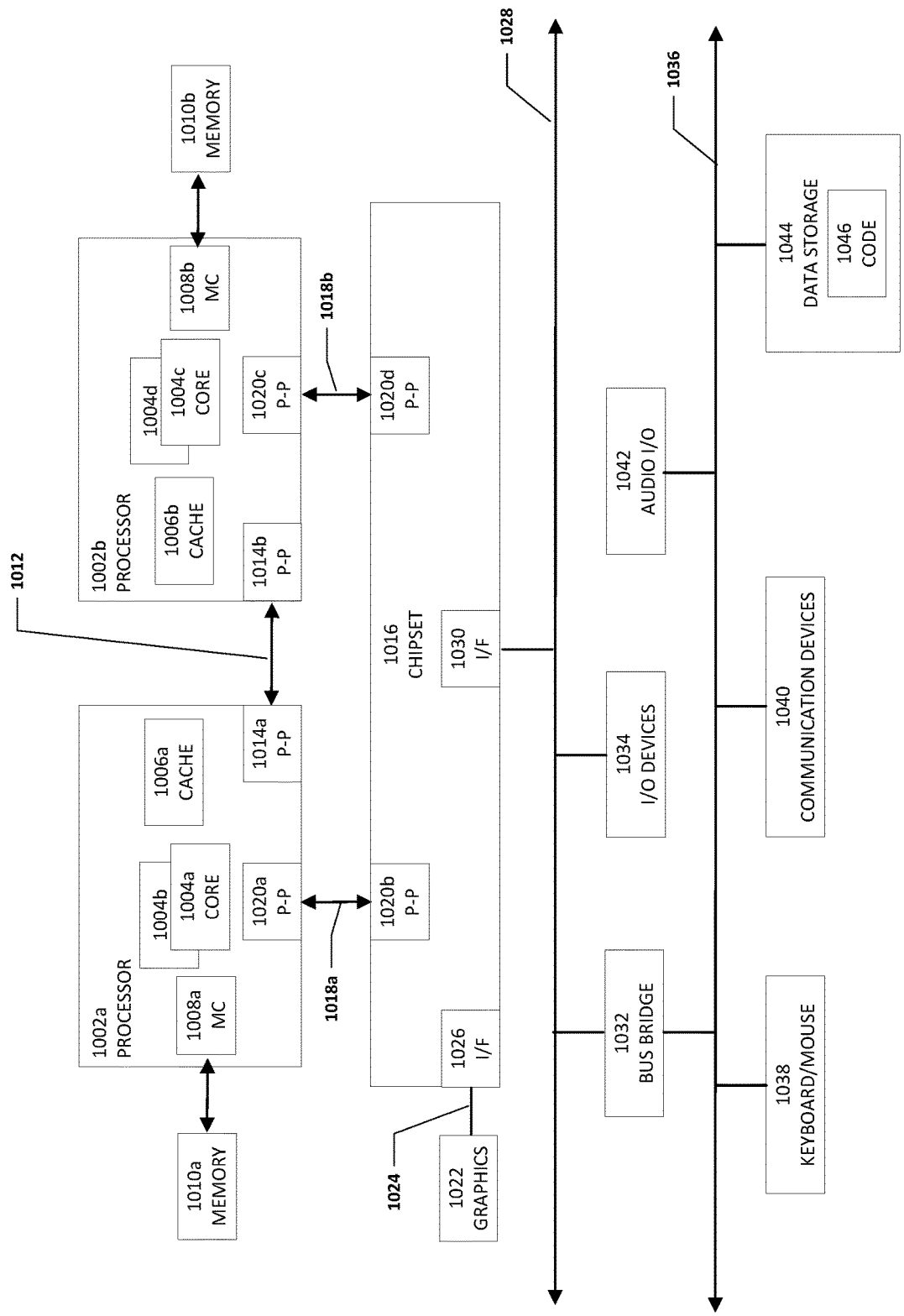
FIG. 10 is a block diagram illustrating an example computing system that is arranged in a point-to-point configuration in accordance with an embodiment.

Turning to FIG. 10, FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the network elements of system 100 may be configured in the same or similar manner as computing system 1000.

As illustrated in FIG. 10, system 1000 may include several processors, of which only two, processors 1002a and 1002b, are shown for clarity. While two processors 1002a and 1002b are shown, it is to be understood that an embodiment of system 1000 may also include only one such processor. Processors 1002a and 1002b may each include a set of cores (i.e., processors cores 1004a and 1004b and processors cores 1004c and 1004d) to execute multiple threads of a program. The cores may be configured to execute instruction code in a manner similar to that discussed above with reference to FIGS. 1-8. Each processor 1002a and 1002b may include at least one shared cache 1006a and 1006b respectively. Shared caches 1006a and 1006b may each store data (e.g., instructions) that are utilized by one or more components of processors 1002a and 1002b, such as processor cores 1004a and 1004b of processor 1002a and processor cores 1004c and 1004d of processor 1002b.

Processors 1002a and 1002b may also each include integrated memory controller logic (MC) 1008a and 1008b respectively to communicate with memory elements 1010a and 1010b. Memory elements 1010a and/or 1010b may store various data used by processors 1002a and 1002b. In alternative embodiments, memory controller logic 1008a and 1008b may be discrete logic separate from processors 1002a and 1002b.

Processors 1002a and 1002b may be any type of processor and may exchange data via a point-to-point (PtP) interface 1012 using point-to-point interface circuits 1014a and 1014b respectively. Processors 1002a and 1002b may each exchange data with a chipset 1016 via individual point-to-point interfaces 1018a and 1018b using point-to-point interface circuits 1020a-1020d. Chipset 1016 may also exchange data with a high-performance graphics circuit 1022 via a high-performance graphics interface 1024, using an interface circuit 1026, which could be a PtP interface circuit. In alternative embodiments, any or all of the PtP links illustrated in FIG. 10 could be implemented as a multi-drop bus rather than a PtP link.

Chipset 1016 may be in communication with a bus 1028 via an interface circuit 1030. Bus 1028 may have one or more devices that communicate over it, such as a bus bridge 1032 and I/O devices 1034. Via a bus 1036, bus bridge 1032 may be in communication with other devices such as a keyboard/mouse 1038 (or other input devices such as a touch screen, trackball, etc.), communication devices 1040 (such as modems, network interface devices, or other types of communication devices that may communicate through a network), audio I/O devices 1042, and/or a data storage device 1044. Data storage device 1044 may store code 1046, which may be executed by processors 1002a and/or 1002b. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 11:
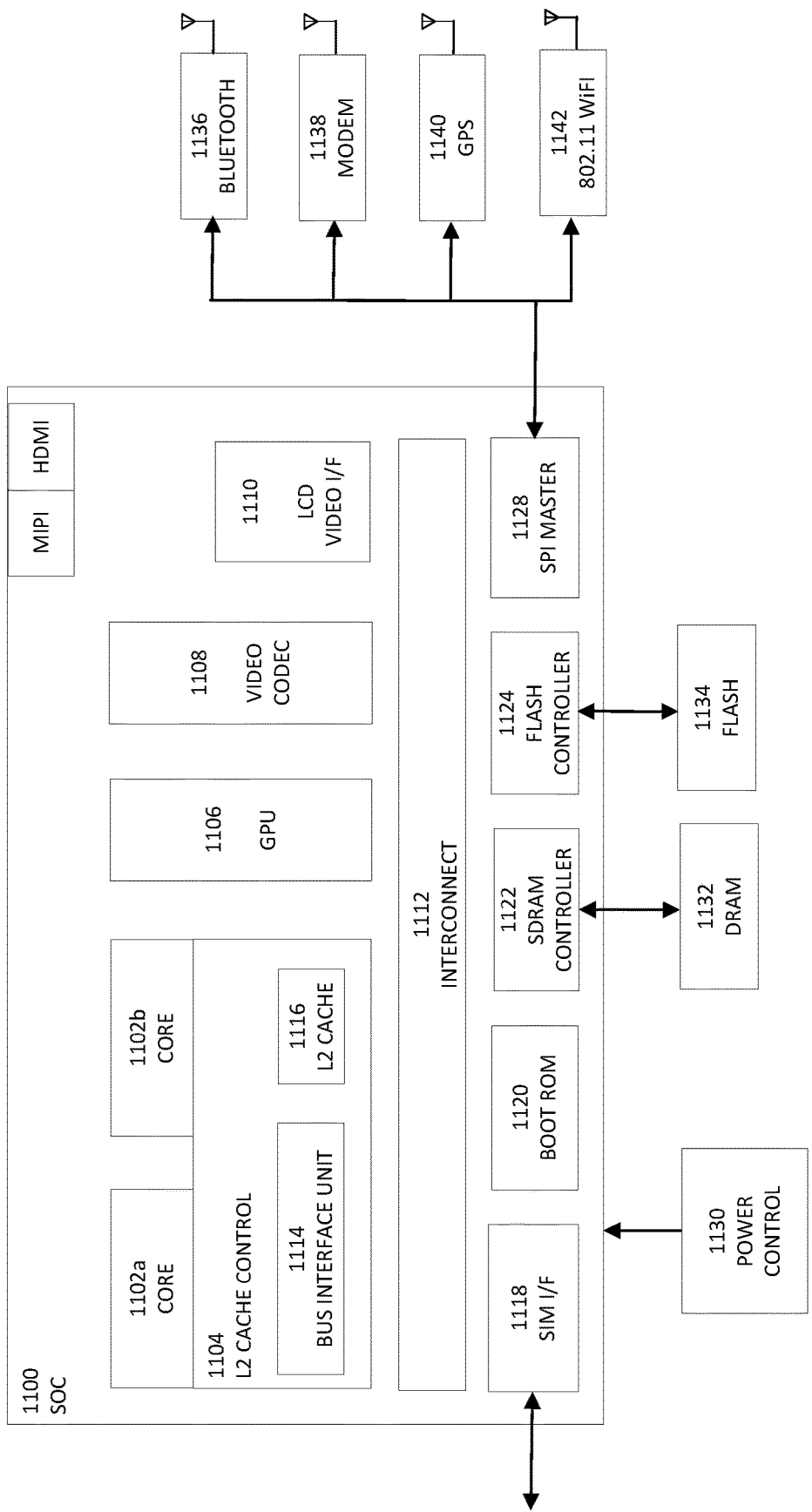
FIG. 11 is a simplified block diagram associated with an example ARM ecosystem system on chip (SOC) of the present disclosure.

Turning to FIG. 11, FIG. 11 is a simplified block diagram associated with an example ecosystem SOC 1100 of the present disclosure. At least one example implementation of the present disclosure can include the device pairing in a local network features discussed herein and an ARM component. For example, the example of FIG. 11 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 11, ecosystem SOC 1100 may include multiple cores 1102a and 1102b, an L2 cache control 1104, a graphics processing unit (GPU) 1106, a video codec 1108, a liquid crystal display (LCD) I/F 1110 and an interconnect 1112. L2 cache control 1104 can include a bus interface unit 1114, a L2 cache 1116. Liquid crystal display (LCD) I/F 1110 may be associated with mobile industry processor interface (MIPI)/high-definition multimedia interface (HDMI) links that couple to an LCD.

Ecosystem SOC 1100 may also include a subscriber identity module (SIM) I/F 1118, a boot read-only memory (ROM) 1120, a synchronous dynamic random-access memory (SDRAM) controller 1122, a flash controller 1124, a serial peripheral interface (SPI) master 1128, a suitable power control 1130, a dynamic RAM (DRAM) 1132, and flash 1134. In addition, one or more embodiments include one or more communication capabilities, interfaces, and features such as instances of Bluetooth™ 1136, a 3G modem 0138, a global positioning system (GPS) 1140, and an 802.11 Wi-Fi 1142.

In operation, the example of FIG. 11 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 12:
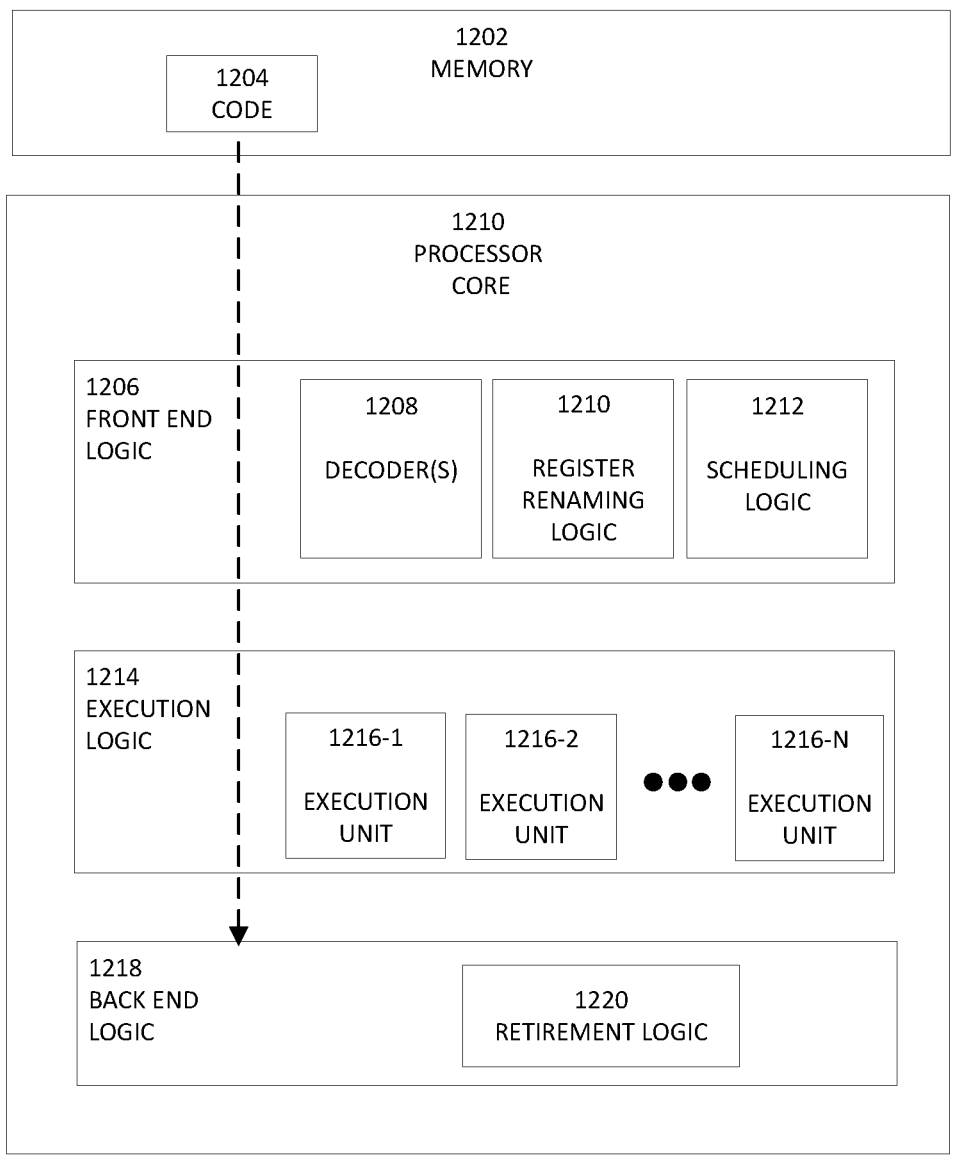
FIG. 12 is a block diagram illustrating an example processor core in accordance with an embodiment.

Turning to FIG. 12, FIG. 12 illustrates a processor core 1200 according to an embodiment. Processor core 1200 may be the core for any type of processor, such as a microprocessor, an embedded processor, a digital signal processor (DSP), a network processor, or other device to execute code. Although only one processor core 1200 is illustrated in FIG. 12, a processor may alternatively include more than one of the processor core 1200 illustrated in FIG. 12. For example, processor core 1200 represents one example embodiment of processors cores 1004a-1004d shown and described with reference to processors 1002a and 1002b of FIG. 10. Processor core 1200 may be a single-threaded core or, for at least one embodiment, processor core 1200 may be multi-threaded in that it may include more than one hardware thread context (or "logical processor") per core.

FIG. 12 also illustrates a memory 1202 coupled to processor core 1200 in accordance with an embodiment. Memory 1202 may be any of a wide variety of memories (including various layers of memory hierarchy) as are known or otherwise available to those of skill in the art. Memory 1202 may include code 1204, which may be one or more instructions, to be executed by processor core 1200. Processor core 1200 can follow a program sequence of instructions indicated by code 1204. Each instruction enters a front-end logic 1206 and is processed by one or more decoders 1208. The decoder may generate, as its output, a micro operation such as a fixed width micro operation in a predefined format, or may generate other instructions, microinstructions, or control signals that reflect the original code instruction. Front-end logic 1206 also includes register renaming logic 1210 and scheduling logic 1212, which generally allocate resources and queue the operation corresponding to the instruction for execution.

Processor core 1200 can also include execution logic 1214 having a set of execution units 1216-1 through 1216-N. Some embodiments may include a number of execution units dedicated to specific functions or sets of functions. Other embodiments may include only one execution unit or one execution unit that can perform a particular function. Execution logic 1214 performs the operations specified by code instructions.

After completion of execution of the operations specified by the code instructions, back-end logic 1218 can retire the instructions of code 1204. In one embodiment, processor core 1200 allows out of order execution but requires in order retirement of instructions. Retirement logic 1220 may take a variety of known forms (e.g., re-order buffers or the like). In this manner, processor core 1200 is transformed during execution of code 1204, at least in terms of the output generated by the decoder, hardware registers and tables utilized by register renaming logic 1210, and any registers (not shown) modified by execution logic 1214.

Although not illustrated in FIG. 12, a processor may include other elements on a chip with processor core 1200, at least some of which were shown and described herein with reference to FIG. 10. For example, as shown in FIG. 10, a processor may include memory control logic along with processor core 1200. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that system 100 and its teachings are readily scalable and can accommodate a large number of components, as well as more complicated/sophisticated arrangements and configurations. Accordingly, the examples provided should not limit the scope or inhibit the broad teachings of system 100 as potentially applied to a myriad of other architectures.

It is also important to note that the operations in the preceding flow diagrams (i.e., FIGS. 3-9) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although system 100 has been illustrated with reference to particular elements and operations that facilitate the communication process, these elements and operations may be replaced by any suitable architecture, protocols, and/or processes that achieve the intended functionality of system 100

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example M1 is a method including identifying a website, determining scripts associated with the website, blocking the website if a script associated with the website is blacklisted, obtaining a string format of each of the determined scripts associated with the website, analyzing the string format of each of the determined scripts to determine if a specific script is related to malware, and blocking the website if the specific script is related to malware.

In Example M2, the subject matter of Example M1 can optionally include sending one or more uniform resource locators associated with the website to a network security engine for further analysis when usage of a computer processing unit increases more than a threshold amount during access to the website.

In Example M3, the subject matter of any one of the Examples M1-M2 can optionally include where the malware is cryptomining malware.

In Example M4, the subject matter of any one of the Examples M1-M3 can optionally include where the scripts associated with the website are determined using a webextension application programming interface.

In Example M5, the subject matter of any one of the Examples M1-M4 can optionally include where the string format of each of the determined scripts associated with the website is obtained using an Extensible Markup Language/Hypertext Transfer Protocol request.

In Example M6, the subject matter of any one of the Examples M1-M5 can optionally include where the string format of each of the determined scripts associated with the website are analyzed using a regular expression analysis to determine if the specific script is related to malware.

In Example M7, the subject matter of any one of the Examples M1-M6 can optionally include adding the specific script to a suspicious script database.

Example C1 is at least one machine readable storage medium having one or more instructions that when executed by at least one processor, cause the at least one processor to identify a website, determine scripts associated with the website, block the website if a script associated with the website is blacklisted, obtain a string format of each of the determined scripts associated with the website, analyze the string format of each of the determined scripts to determine if a specific script is related to malware, and block the website if the specific script is related to malware.

In Example C2, the subject matter of Example C1 can optionally include where the one or more instructions that when executed by the at least one processor, further cause the processor to determine if usage of a computer processing unit increases more than a threshold amount during access to the website and send one or more uniform resource locators associated with the website to a network security engine for further analysis when usage of the computer processing unit increases more than a threshold amount during access to the website.

In Example C3, the subject matter of any one of Examples C1-C2 can optionally include where the malware is cryptomining malware.

In Example C4, the subject matter of any one of Examples C1-C3 can optionally include where the scripts associated with the website are determined using a webextension application programming interface.

In Example C5, the subject matter of any one of Examples C1-C4 can optionally include where the string format of each of the determined scripts associated with the website is obtained using an Extensible Markup Language/Hypertext Transfer Protocol request.

In Example C6, the subject matter of any one of Example C1-C5 can optionally include where the string format of each of the determined scripts associated with the website are analyzed using a regular expression analysis to determine if the specific script is related to malware.

In Example C7, the subject matter of any one of Examples C1-C6 can optionally include where the one or more instructions that when executed by the at least one processor, further cause the processor to add the specific script to a suspicious script database.

In Example A1, an apparatus to determine a presence of cryptomining malware can include memory, at least one processor, and a security engine. The security engine can be configured to identify a website, determine one or more uniform resource locators associated with the website, block the website if a uniform resource locator associated with the website is blacklisted, determine scripts associated with the website, block the website if a script associated with the website is blacklisted, obtain a string format of each of the determined scripts associated with the website, analyze the string format of each of the determined scripts to determine if a specific script is related to malware, and block the website if the specific script is related to malware.

In Example, A2, the subject matter of Example A1 can optionally include where the security engine is further configured to determine if usage of a computer processing unit increases more than a threshold amount during access to the website and send the one or more uniform resource locators associated with the website to a network security engine for further analysis when usage of the computer processing unit increases more than a threshold amount during access to the website.

In Example A3, the subject matter of any one of Examples A1-A2 can optionally include where the scripts associated with the website are determined using a webextension application programming interface.

In Example A4, the subject matter of any one of Examples A1-A3 can optionally include where the string format of each of the determined scripts associated with the website is obtained using an Extensible Markup Language/Hypertext Transfer Protocol request.

In Example A5, the subject matter of any one of Examples A1-A4 can optionally include where the string format of each of the determined scripts associated with the website are analyzed using a regular expression analysis to determine if the specific script is related to malware.

In Example A6, the subject matter of any one of Examples A1-A5 can optionally include where the security engine is further configured to add the specific script to a suspicious script database.

Example X1 is a machine-readable storage medium including machine-readable instructions to implement a method or realize an apparatus as in any one of the Examples A1-A7, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A method comprising:
    identifying a website;
    determining scripts associated with the website using a webextension application programming interface;
    blocking the website if a script associated with the website is blacklisted;
    obtaining a string format of each of the determined scripts associated with the website using an Extensible Markup Language/Hypertext Transfer Protocol request;
    analyzing the string format of each of the determined scripts to determine if a specific script is related to cryptomining malware;
    blocking the website if the specific script is related to cryptomining malware; and
    sending one or more uniform resource locators associated with the website to a security engine for further analysis when usage of a computer processing unit increases more than a threshold amount over a predetermined amount of time during access to the website; and
    communicating, to a user, an option to allow access to the website when usage of the computer processing unit increases more than the threshold amount during access to the website.

2. The method of claim 1, wherein the string format of each of the determined scripts associated with the website are analyzed using a regular expression analysis to determine if the specific script is related to malware.

3. The method of claim 2, further comprising:
    adding the specific script to a suspicious script database.

4. The method of claim 1, further comprising:
    communicating a notification to a user when usage of the computer processing unit increases more than the threshold amount during access to the website.

5. The method of claim 1, wherein access to the website and scripts related to the website are blocked if the user does not allow access to the website.

6. The method of claim 1, further comprising:
    determining if an application and/or scripts related to the website are causing the increase in the usage of the computer processing unit.

7. At least one non-transitory computer-readable medium comprising one or more instructions that when executed by at least one processor, cause the at least one processor to:
    identify a website;
    determine scripts associated with the website using a webextension application programming interface;
    block the website if a script associated with the website is blacklisted;
    obtain a string format of each of the determined scripts associated with the website using an Extensible Markup Language/Hypertext Transfer Protocol request;
    analyze the string format of each of the determined scripts to determine if a specific script is related to cryptomining malware;
    block the website if the specific script is related to cryptomining malware;
    send one or more uniform resource locators associated with the website to a security engine for further analysis when an application and/or scripts related to the website cause usage of a computer processing unit to increase more than a threshold amount during access to the website; and
    communicate, to a user, an option to allow access to the website when usage of the computer processing unit increases more than the threshold amount during access to the website.

8. The at least one computer-readable medium of claim 7, wherein the string format of each of the determined scripts associated with the website are analyzed using a regular expression analysis to determine if the specific script is related to malware.

9. The at least one computer-readable medium of claim 8, further comprising one or more instructions that when executed by the at least one processor, further cause the processor to:
    add the specific script to a suspicious script database.

10. The at least one computer-readable medium of claim 7, comprising one or more instructions that when executed by at least one processor, further cause the at least one processor to:
    communicate a notification to a user when usage of the computer processing unit increases more than the threshold amount during access to the website.

11. The at least one computer-readable medium of claim 7, wherein access to the website and scripts related to the website are blocked if the user does not allow access to the website.

12. An apparatus to determine a presence of cryptomining malware, the apparatus comprising:
    memory;
    at least one processor; and
    a security engine, the security engine configured to:
        identify a website;
        determine one or more uniform resource locators associated with the website using a webextension application programming interface;

block the website if a uniform resource locator associated with the website is blacklisted;
determine scripts associated with the website;
block the website if a script associated with the website is blacklisted;
obtain a string format of each of the determined scripts associated with the website using an Extensible Markup Language/Hypertext Transfer Protocol request;
analyze the string format of each of the determined scripts to determine if a specific script is related to cryptomining malware;
block the website if the specific script is related to cryptomining malware;
send one or more uniform resource locators associated with the website to a security engine for further analysis when an application and/or scripts related to the website cause usage of a computer processing unit increases to increase more than a threshold amount over a predetermined amount of time during access to the website; and
communicate, to a user, an option to allow access to the website when usage of the computer processing unit increases more than the threshold amount during access to the website.

13. The apparatus of claim 12, wherein the string format of each of the determined scripts associated with the website are analyzed using a regular expression analysis to determine if the specific script is related to malware.

14. The apparatus of claim 13, wherein the security engine is further configured to:
add the specific script to a suspicious script database.

15. The apparatus of claim 12, wherein the security engine is further configured to:
communicate a notification to a user when usage of the computer processing unit increases more than the threshold amount during access to the website.

16. The apparatus of claim 12, wherein access to the website and scripts related to the website are blocked if the user does not allow access to the website.

* * * * *

UNITED STATES PATENT AND TRADEMARK OFFICE
CERTIFICATE OF CORRECTION

PATENT NO. : 11,182,480 B2
APPLICATION NO. : 16/145945
DATED : November 23, 2021
INVENTOR(S) : William Park et al.

Page 1 of 1

It is certified that error appears in the above-identified patent and that said Letters Patent is hereby corrected as shown below:

In the Claims

In Column 17, Claim 1, Lines 45-46, delete "and sending" and insert -- sending --, therefor.

In Column 19, Claim 12, Line 19, delete "increases to" and insert -- to --, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*